United States Patent

Brosseau

[15] 3,643,197
[45] Feb. 15, 1972

[54] THERMORESPONSIVE CONTROL FOR ELECTRICAL HEATING UNITS

[72] Inventor: Joseph E. Brosseau, St. Charles, Ill.
[73] Assignee: Joseph E. Brosseau Co., Franklin Park, Ill.
[22] Filed: Nov. 2, 1970
[21] Appl. No.: 86,234

[52] U.S. Cl..............................337/370, 219/450, 219/508, 337/3, 337/335, 337/397
[51] Int. Cl........................................................H01h 37/52
[58] Field of Search..................219/449, 450, 452, 508, 510; 337/40, 39, 95, 3, 335, 370, 384, 397

[56] References Cited

UNITED STATES PATENTS

| | | | |
|---|---|---|---|
| 2,769,060 | 10/1956 | Franklin | 337/370 |
| 3,118,044 | 1/1964 | Holtkamp | 219/450 |
| 3,155,815 | 11/1964 | Clapp | 219/508 |
| 3,221,123 | 11/1965 | Huffman | 219/450 X |
| 3,414,710 | 12/1968 | Mertler | 219/450 |

Primary Examiner—Volodymyr Y. Mayewsky
Attorney—John W. Michael, Gerrit D. Foster, Bayard H. Michael, Paul R. Puerner, Joseph A. Gemignani, Andrew O. Riteris and Spencer B. Michael

[57] ABSTRACT

The inverted cuplike shield is biased into contact with the bottom of a cooking utensil so the sensing bimetal responds to the utensil temperature. As the heat rises, the bimetal moves right to move the right contact arm away from the left contact arm which is positioned by the ambient temperature sensing bimetal carried by a bracket which is adjustable to select the temperature to be maintained by the control. Preferably the right contact arm is a high-resistance bimetal through which current flows when the contacts are closed and which warps to the right when heated to act as an anticipator in that it can open the contacts before the sensing bimetal would. The anticipator then functions to anticipate the need for additional heat. This allows the control to gradually approach the set temperature without overshoot. When the control regulates a high-wattage heater such as a heating unit on a range, the heating of the anticipator bimetal is satisfactory but in low-wattage uses the heating may be too low for the anticipator to function. In such cases a resistance heater can be mounted on or adjacent the anticipator bimetal.

3 Claims, 3 Drawing Figures

PATENTED FEB 15 1972

3,643,197

Inventor
Joseph E. Brosseau
By Bernard H. Michael
Attorney

THERMORESPONSIVE CONTROL FOR ELECTRICAL HEATING UNITS

BACKGROUND OF INVENTION

In the utensil temperature sensing controls currently on the market there is a considerable overshoot in temperature when starting up. This is caused by the control responding simply to the temperature of the pan and when the selected temperature is sensed and the electric heating element is deenergized, there is sufficient residual heat in the element to cause a considerable further increase in the temperature of the utensil. This, combined with the inherent temperature differential of the sensing arrangement, causes the temperature curve to be a saw tooth rising above and then dropping below the selected temperature. Given enough time this arrangement will stabilize at the selected temperature but in the interim the temperature can vary quite widely and it is in this interval that much of the cooking is done. Another problem area is in the case of high-temperature operation. For example, assume the control has been set to hold at 400° and the pan has been elevated to that temperature. If slices of potato, for example, are then added to the pan there will be an immediate temperature drop to which the control will respond by applying more heat to the pan but before it can sense and stabilize again, this temperature can rise as high as 500° and burn the contents.

SUMMARY OF INVENTION

The present invention is directed towards provision of a control which avoids the marked overshoot problem of the prior art and instead gradually approaches the selected temperature. The present anticipated control as described in the abstract will open the heating circuit before the selected temperature is reached. In the usual operation the control then starts pulsing the heat supply.

DESCRIPTION OF PREFERRED EMBODIMENT

Figure 1:
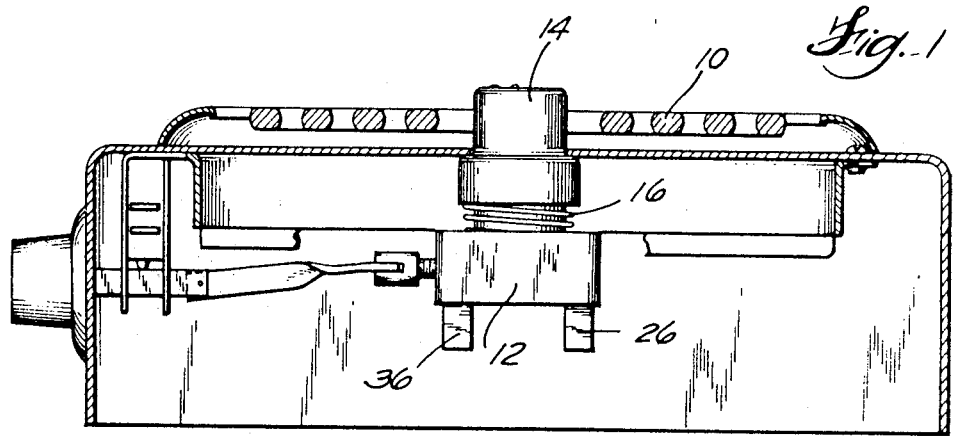
FIG. 1 is a simplified vertical section orienting the control to an electric "burner."
Figure 2:
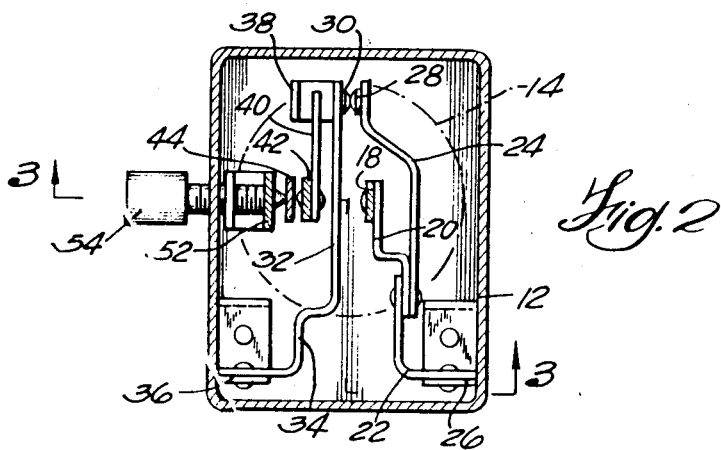
FIG. 2 is a horizontal section through the base of the control.
Figure 3:
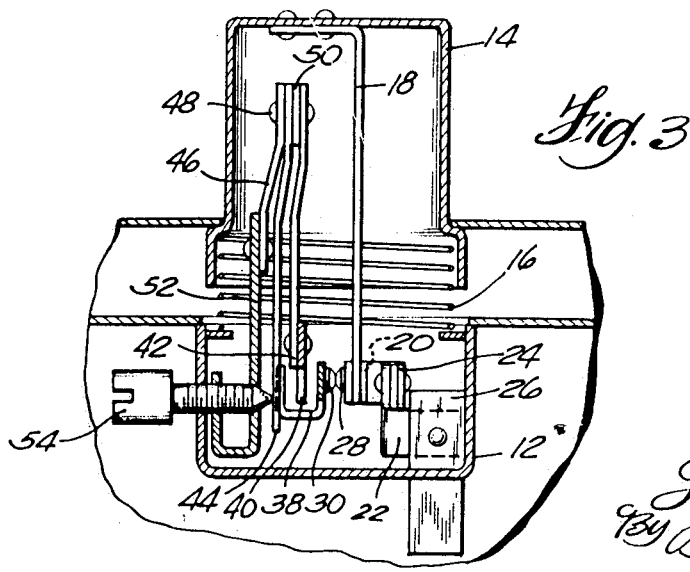
FIG. 3 is a vertical section on line 3—3 in FIG. 2.

The drawings show the control positioned concentrically relative to a conventional heating element comprising a spiraled resistance heating element 10. The control itself comprises a stationary housing 12 which supports an inverted cuplike member 14 which is biased by spring 16 to project above the surface of the heating element. When the cooking utensil is placed on the heating element, member 14 is depressed so that it is flush with the heating element surface and is in close, spring-loaded contact with the underside of the cooking utensil. This shroud 14 supports a sensor bimetal 18 which, in the drawings, will warp to the right as the sensed heat increases. The lower end of the sensor bimetal bears against an insulator attached to finger or follower 20 which is supported on the very flexible bronze blade 22 which also supports the anticipator bimetal 24. The flexible bronze blade 22 acts to slightly bias the follower 20 against the sensing bimetal 18. The blade 22 also acts as a conductor and terminal 26 constitutes one input to this system. This is part of a switch controlling the heating element. Current flowing to the heating element will flow through the anticipator bimetal 24.

The free end of the anticipator bimetal carries a contact 28 which can engage contact 30 on the free end of arm 32 which is supported by a very flexible bronze blade 34 leading to terminal 36. This blade 34 acts to quite flexibly support the arm 32 with a slight bias towards the right so that the tab 38 carried by the free end of arm 32 tends to engage the insulated tab 40 carried by the lower free end of compensating bimetal 42. The upper end of compensating bimetal 42 is connected to adjusting lever 44 and the flexible support 46 by means of rivet 48. It has been found important to include a washer 50 in the stack to insure a free-swinging range of movement for the compensator bimetal 42. The flexible support 46 is connected to bracket 52 through which the adjusting screw 54 acts against the lower end of the adjusting lever 44. This, then, acts to position the adjusting lever relative to the fixed bracket 52 and to position the compensator bimetal. The compensator bimetal acts to limit the movement of contact 30 towards contact 28, the limit being determined by engagement of tab 38 with finger 40 projecting to the side of the free end of the compensating bimetal.

The adjusting screw 54 is turned to, in effect, select the temperature which will be maintained in the cooking utensil. Assuming a cold start, the contacts 28 and 30 will be closed and current will flow to the heating element 10. The current passes through the anticipator bimetal 24. The anticipator bimetal will tend to warp to the right as will the sensing bimetal and the compensating bimetal. Before the selected temperature is reached, the anticipator bimetal will cause contact 28 to move away from the contact 30, assuming the heating element has the normal high wattage found on a cooking range. Thus the heat input is interrupted before the selected temperature is reached. As soon as the circuit is broken, the anticipator bimetal will start moving to the left to again engage contact 28 with contact 30. Thus the energy supply to the heating element is pulsed to gradually approach the selected temperature. When the selected temperature is reached, the sensing bimetal will also control the opening and closing of contacts 28 and 30. If relatively cold contents are now placed in the cooking utensil, the temperature will, of course, drop but the control will sense this and start supplying current to the heating element but, again, the pulsing effect of the anticipator will take over to avoid overshoot.

It should be noted that the anticipator bimetal not only anticipates the approach to the selected temperature but also imposes a pulsing function in that it immediately responds to its own cooling to resume the heat input. Thus it anticipates the need for more heat.

The prior art arrangements which rely on attaining the selected temperature before reducing the heat input experience a considerable overshoot in temperature because of the residual heat in the heating element. This control does not experience such overshoot to any great extent. The more active the anticipator bimetal is, the less likely overshoot will occur even with very small quantities (heat load) in the cooking utensil. On the other hand, a very active anticipator bimetal means that the pulsing will occur sooner and more frequently and the control will take longer to reach the selected temperature. By selecting the response rate of the anticipator bimetal, one can, in effect, optimize accuracy and time considerations. It is interesting to note the present arrangement responds well on substandard voltage since this automatically increases the "on" time of the heating element since the anticipator bimetal responds less rapidly. Similarly, if the supply voltage is too high, the pulse rate is increased due to the more active response of the anticipator bimetal. Tests indicate that the selected temperature will be reached in almost exactly the same period under the same load conditions with standard, low or high supply voltage.

If this control is to be applied to low-wattage situations such as a soldering iron, the amount of current flowing through the anticipator frequently will not be sufficient to get the desired anticipation effect. In such cases it is a simple matter to provide a separate resistance heater to supplement the heat input to the anticipator bimetal.

In either event the sensing is not affected by the self-heating of the anticipator bimetal or ambient temperature since the compensator bimetal functions to adjust for ambient. In a sense it might be said that this control is really sensing the difference in temperature between the compensator bimetal and the sensing bimetal once the compensator bimetal has been referenced by the adjusting screw for a selected temperature. It will be noted that the adjusting screw, in effect, moves the compensator bimetal closer to the sensing bimetal and thus the sensing bimetal and/or the anticipator bimetal must, in effect, move contact 28 further to break the circuit at higher temperatures.

In some cases it may not be considered necessary to have the fine accuracy of the present control and in those cases the anticipator bimetal can be eliminated with substitution of a simple contact arm. Under those conditions overshoot will be experienced since then the control functions only in response to the sensed temperature (relative to ambient). Particularly with a small quantity in the heating utensil, there will be a considerable overshoot in such cases. Typically, this will give a saw-toothed time temperature curve modulating about the selected temperature in a damped fashion and finally stabilizing reasonably well. Such a control performs particularly poorly, however, if you have selected, for example, 400° and then add potatoes to the pan after the 400° mark has been reached. At that time the sensor will call for a considerable input and the input will be maintained until the sensor again responds to the selected temperature. The overshoot under these conditions, however, can amount to enough added heat input to burn the contents and it is indeed in this area that the presently available controls are sorely lacking. With the use of the anticipator bimetal according to this invention there is no overshoot of this type.

I claim:
1. A control for regulating energization of an electric heating element to maintain a selected temperature in the heated object comprising,
   a bracket supported on a base,
   an ambient temperature responsive bimetal mounted on the bracket,
   a contact arm biased to engage and be positioned by the ambient bimetal,
   a sensing bimetal positioned to be influenced by the heated object,
   a second contact arm biased to engage and be positioned by the sensing bimetal,
   contacts carried by the arms and closed until the second arm is moved from the first,
   means for adjusting one of said arms relative to the other whereby the maintained temperature may be selected.
2. A control according to claim 1 in which the second arm is a third bimetal which is heated when the contacts are closed and warps in response to such heating to move away from the first arm.
3. A control according to claim 2 in which the third bimetal is a high-resistance material which is self-heated in response to current flow therethrough.

* * * * *